Figure 1:
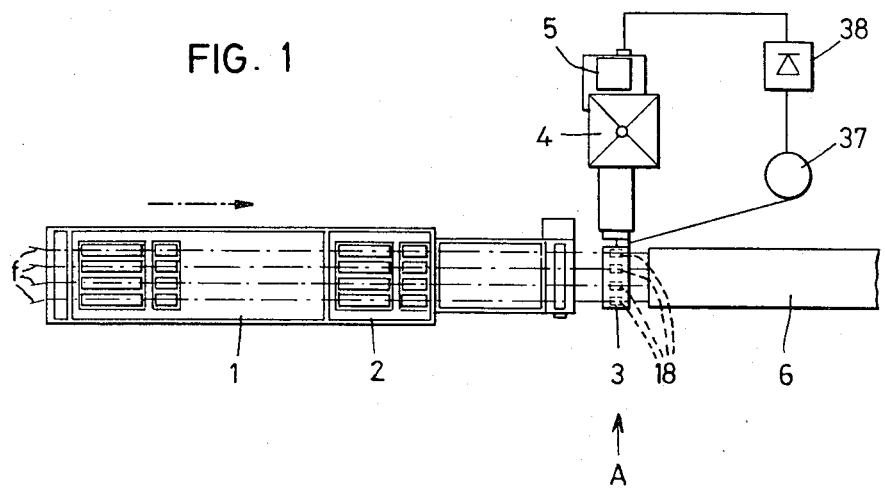

United States Patent [19]

Kertscher

[11] 4,379,102

[45] Apr. 5, 1983

[54] METHOD FOR MANUFACTURING ELECTRIC WIRE HAVING WIRE-ENAMEL-TYPE INSULATION

[75] Inventor: Eberhard Kertscher, Romanel, Switzerland

[73] Assignee: Maillefer S.A., Ecublens, Switzerland

[21] Appl. No.: 204,755

[22] Filed: Nov. 6, 1980

Related U.S. Application Data

[60] Continuation of Ser. No. 26,060, Apr. 2, 1979, abandoned, which is a division of Ser. No. 811,362, Jun. 29, 1977, Pat. No. 4,165,957.

[30] Foreign Application Priority Data

Jul. 1, 1976 [CH] Switzerland ..................... 8446/76

[51] Int. Cl.³ .............................................. B29F 3/10
[52] U.S. Cl. .................... 264/40.7; 264/40.1; 264/174
[58] Field of Search ............ 264/174, 40.1, 40.7; 428/378, 379

[56] References Cited

U.S. PATENT DOCUMENTS

| | | | |
|---|---|---|---|
| 2,386,818 | 10/1945 | Seavey | 264/174 |
| 2,943,351 | 7/1960 | Gray | 264/174 |
| 3,071,809 | 1/1963 | Lerch . | |
| 3,541,038 | 11/1970 | Nakano et al. | 428/379 |
| 3,551,200 | 12/1970 | Stivers | 428/379 |
| 3,674,627 | 7/1972 | Angelo | 428/379 |
| 3,779,808 | 12/1973 | Cottis et al. | 428/379 |
| 3,803,103 | 4/1974 | Magay | 428/379 |
| 3,860,686 | 1/1975 | Myers | 264/174 |
| 3,986,477 | 10/1976 | Bigland | 425/113 |
| 4,089,917 | 5/1978 | Takiura | 264/174 |

FOREIGN PATENT DOCUMENTS 458383  7/1949  Canada ............................. 264/174

*Primary Examiner*—James B. Lowe
*Attorney, Agent, or Firm*—Michael J. Striker

[57] ABSTRACT

A method of manufacturing insulated electric wire of the enamelled-wire type wherein an insulating sheath adhering to the wire is formed by extrusion of selected thermoplastics which are heated to a temperature above their melting-point, then pressed onto the wire while in a fluid state. The extrusion apparatus includes a gauging die with a compressing cone having an aperture angle of from 2° to 20°, preferably 7°.

6 Claims, 3 Drawing Figures

METHOD FOR MANUFACTURING ELECTRIC WIRE HAVING WIRE-ENAMEL-TYPE INSULATION

CROSS-REFERENCE TO RELATED APPLICATION

This application is a continuation of patent application Ser. No. 26,060 filed Apr. 2, 1979, now abandoned, which is a divisional application of patent application Ser. No. 811,362 filed June 29, 1977, now U.S. Pat. No. 4,165,957.

This invention relates to a method and apparatus for manufacturing electric wire having insulation of the wire-enamel type, wherein a high-melting-point synthetic resin is heated to a temperature at least as high as its melting-point, and a thin sheath of resin is formed about the wire.

What is called "insulated electric wire of the enamelled-wire type" is wire which is intended to be used in producing windings for electrical apparatus such as motors, transformers, magnetic coils, or other electrical components intended to operate under load conditions such that their temperature is higher than the ambient temperature. For reasons of space-saving and economy, the sheath of insulating material covering such wire should be as thin as possible, while for reasons of durability and reliability, the insulating material should be stable at the operating temperature.

The requirements which must be met by such wire are laid down in certain standard specifications. According to the German Industrial Standards, for example, these requirements are set forth particularly in DIN Sheets 46435 and 46416.

The traditional method of manufacture utilized for wire having enamel-type insulation consists in preparing a solution of an organic synthetic resin in a suitable solvent. This liquid is placed in arrangements through which the wire passes. A film of liquid is then deposited on the surface of the wire. This method requires a subsequent treatment operation to remove the solvent. Moreover, it necessitates several successive passages of the wire through the bath of insulating material in order to obtain the required thickness of insulation. Finally, the speed at which the wire travels is necessarily limited to a rate on the order of several meters per minute.

In order to avoid the drawbacks of this traditional system, especially the detrimental effects on the environment caused by the burning or evaporation of the solvent and the waste of energy involved in this operation, it has already been sought to replace the soluble resins used heretofore by synthetic materials capable of being heated without deterioration up to a temperature above that which the insulating material must withstand during operation. According to German Disclosed Application (DOS) No. 2,135,157, the plastic material is contained in bath heated to a temperature above the melting-point. However, this method is delicate to carry out owing to the high temperatures required. It is slow, and it also leads to waste of material when an operation must be interrupted, for the remainder of the material still contained in the recipient is then generally lost.

According to German Application (DOS) No. 2,022,802, a synthetic resin without solvent is introduced into an extruder, then forced into an extrusion unit. The latter forms a tube of plastic material, thicker than the ultimate insulating layer, about the wire in the open air. This tube leaves the extruder at a lower speed than that at which the wire travels through the extrusion unit. The tube contracts on the wire as it cools and is subjected to drawing at the exit of the extrusion head. The insulating material requires further treatment. This method yields the thickness of insulation specified by the standards, i.e., not exceeding about 15–34 microns, for example, for a wire 1 mm. in diameter having a single layer of insulation. For reinforced insulation, the standard thickness of the layer of insulating material is from 30 to 46 microns. However, the insulated wire of the enamelled-wire type obtained in this manner is not uniform. German Disclosed Application (DOS) No. 2,110,934 also describes a method of the same type.

It is known that for producing insulated wire intended for use in low-current installations, e.g., telephone wire, it is customary to deposit a thermoplastic insulating material on gauged cooper or aluminum wire in an extrusion operation by means of a unit which forms a sheath about the wire. It has hitherto been thought that it was not possible to use such a unit for forming such thin sheaths as those required by the above-mentioned standards, above all not if the insulating material was one having high thermal resistance.

It has been found, however, that contrary to this prejudice, it is possible to use such a unit under certain conditions, and it is an object of this invention to provide an improved method of manufacturing electric wire of the type initially mentioned which enables high-speed production thereof by means of an extrusion unit, the resultant enamel-type insulated wire having surface qualities, hardness, thickness of insulation, and performance at high temperatures meeting the requirements of the standards in force.

To this end, in the method according to the present invention, the improvement comprises the steps of passing the wire through an extrusion unit, forcing the heated resin into the extrusion unit, and pressing the resin about the wire within the extrusion unit.

It is a further object of the invention to provide apparatus for carrying out the aforementioned method. According to the invention, this apparatus comprises a screw extruder having an outlet orifice, an extrusion head secured to that orifice, and one or more extrusion units forming part of the extrusion head and each including a gauging die having compressing means.

Figure 2:
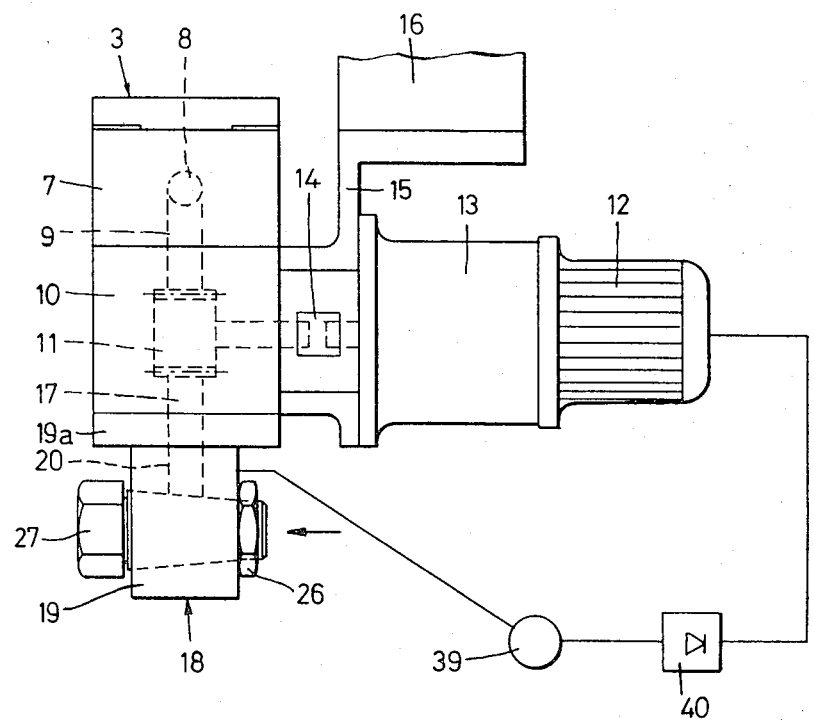
Figure 3:
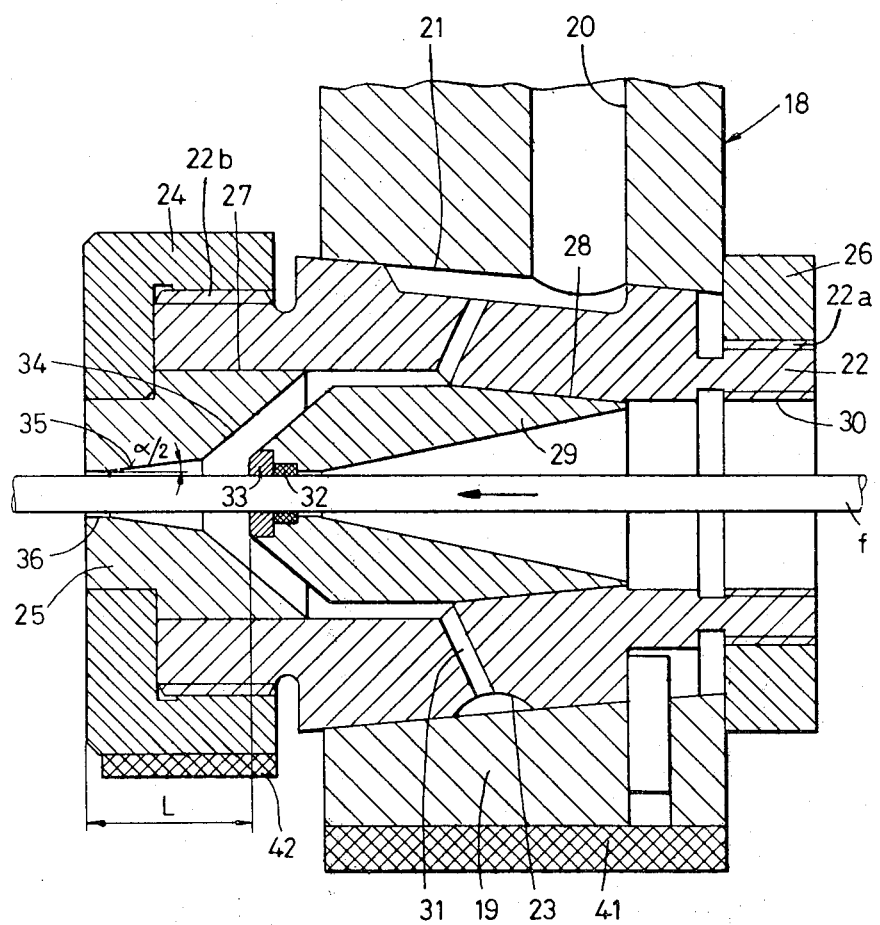

A preferred embodiment of the invention will now be described in detail with reference to the accompanying drawings, in which:

FIG. 1 is a diagrammatic plan view of apparatus for carrying out the method according to the invention, FIG. 2 is an elevation, on a larger scale of a multiple extrusion head, and FIG. 3 is an axial section, on a still larger scale, of an extrusion unit fixed to the multiple extrusion head.

The apparatus illustrated in the drawings comprises a wiredrawer 1 an annealer 2, a mutliple extrusion head 3 secured to the end of the cylinder of an extruder 4 driven by a motor 5, and a cooling vat 6. The apparatus as a whole is designed for the simultaneous treatment of four wires f conveyed parallel to one another through the various parts of the apparatus. The wires f may be of copper or aluminum and about 1 mm. in diameter, for example. They emanate from a pay-out installation (not shown) which supplies the wiredrawer 1. Upon leaving the cooling vat 6, the wires f are taken up by a withdrawal mechanism and led onto reels (not shown).

The wiredrawer 1 may be of a conventional type having one or more stages. It need not be described in detail here.

The annealer 2 is likewise of a type known per se. It will preferably be a resistance-type annealer having electrolyte contact devices. Each wire f is thus guided by pulleys so as to follow a vertical path and passes through two pots which contain an electrolyte and establish the contact between the wire and the current feed. Between these pots, an electric current passes through the wire and heats it to annealing temperature. The electrolyte ensures not only good contact between the wire and the current feed but also pickling or descaling of the wire.

Immediately after the annealer 2, each of the four wires f passes through a respective extrusion unit of the multiple head 3 so as to be coated with an insulating sheath at a temperature corresponding to that of the liquid insulating material forming that sheath. The multiple head 3 is shown in greater detail in FIGS. 2 and 3. It comprises at the top a distributor 7 through which there passes a horizontal duct 8 communicating with the outlet orifice of the extruder 4. The distributor duct 8 has four vertical branches 9, each of which passes through a body 10 of a respective displacement pump 11 rotatingly driven by an electric motor 12. Each motor 12 drives the associated pump 11 via a speed-reducer 13 and a coupling 14. The pumps 11 are, for example, gear pumps. The motors 12 and the speed-reducers 13 are secured to a pedestal 15 which is in turn fixed to a support 16. The bodies 10 of the pumps 11 may be combined into a single unit secured beneath the distributor 7 and attached to the pedestal 15. Each pump 11 discharges into an outlet duct 17 extending vertically downwards within the body 10 and communicating with a respective extrusion unit 18. The extrusion units 18 are situated in the paths of the wires f, one of which passes axially through each unit 18.

The extrusion unit 18 shown in FIG. 3 is composed of various parts assembled in such a way as to be easily dismantled. The unit 18 comprises a body 19 fixed beneath the pump body 10 by means of a flange 19a; an inlet duct 20 passes through the top of the body 19 and communicates with the discharge duct 17. The duct 20 opens out into a frustoconical bore 21, the axis of which is horizontal, in which bore there is disposed a die-holder 22, the outer side surface of which is likewise frustoconical and bears against the bore 21. The die-holder 22 is a tubular part, in the frustoconical side surface of which there is an annular groove 23 which communicates with the duct 20 and serves to distribute the plastic material. The two ends 22a and 22b of the die-holder 22 are threaded and intended to receive, respectively, a check-nut 24 for holding a gauging die 25 on the downstream end 22b and a nut 26 for securing the die-holder 22 to the body 19 at the upstream end 22a. The interior of the tubular part 22 has at its downstream end a cylindrical bore 27 in which the gauging die 25 is fitted, in the middle a frustoconical bore 28 which holds and centers a guiding die 29, and at the upstream end a cylindrical bore 30, the diameter of which corresponds to that of the smaller-diameter end of the frustoconical bore 28. A series of oblique holes 31 are drilled in the die-holder 22 between the bottom of the groove 23 and the zone where the bore 27 joins the bore 28. Through the holes 31, the plastic material discharged into the duct 20 reaches the space bounded by the bore 27 and the gauging and guiding dies 25 and 29 situated one behind the other within the die-holder 22. This space constitutes a distribution chamber which feeds the die 25. The dies 25 and 29 are high-precision parts. The central passage way of the die 29 contains a diamond ring-gauge 32 secured by means of a pierced cap 33 and having a central aperture matching the wire f in diameter. The downstream face of the die 29 is of frustoconical shape; the side surface thereof is cylindrical and faces the bore 27; the downstream face of the pierced cap 33 is plane and perpendicular to the axis of its central passageway.

The die 25 comprises, on the upstream side thereof, an entry cone 34, the surface of which is substantially parallel to the downstream face of the die 29 and which bounds, together with the latter, an annular zone of the aforementioned distribution chamber, the thickness of which varies gradually and is so calculated that the plastic material will be gradually accelerated as it moves towards the axis of the unit. The inner end of the entry cone 34 of the die 25 joins a compression cone 35 which bounds the central passageway of the die 25 and joins a cylindrical bore 36 extending up to the downstream end of the die 25.

It has been found that the dimensioning of the gauging die 25 plays a very important part in obtaining the desired result. The frustoconical bore 35 forming the compressing means must have an aperture angle $\alpha$ of between 2° and 20°, as the case may be, but preferably 7° for the examples cited here, while the diameter of the cylindrical bore 36 will be equal to the outside diameter of the insulating sheath to be deposited on the wire f. This diameter will therefore be slightly greater than that of the wire f; the difference can vary from about 10 microns to about 100 microns depending upon the characteristics desired for the insulated wire and required by the standards. The length L, which represents the distance between the exit of the gauging die 25 and the exit of the guiding die 29, also plays a large part in obtaining the desired result. The length L may vary from 4 mm. to 40 mm. depending upon the application. Finally, the gauging die 25 will preferably be made of sintered hard metal (tungsten carbide), and its inner faces which are in contact with the plastic material will exhibit a mirror-polish surface condition preferably obtained by an electrolytic polishing operation.

As has already been stated above, the extruder 4 is a screw extruder, the cylinder of which contains a single screw and which is driven by the motor 5 at a variable speed. The extruder 4 is equipped with regulating means comprising a pressure detector 37 connected to the outlet of the extruder and a regulator 38 which controls the speed of the motor 5. This arrangement controls the flow of plastic material and keeps the pressure constant at the outlet of the extruder 4. The motors 12 driving the pumps 11 are likewise controlled by regulating devices, each comprising a pressure detector 39, responsive to the pressure prevailing in the duct 20, and a regulator 40 controlling the speed of the motor 12. Thus there is obtained a flow of plastic material which is controlled at a constant value and which reaches the die-holder 22 at a pressure which is likewise constant.

As concerns the temperature conditions, these, too, must be very precisely controlled. For this purpose, both the cylinder of the extruder and the extrusion head may be provided with heating elements. Thus the body 19 of the extrusion unit 18 illustrated in FIG. 3 bears a heating element 41. Temperature sensors may be mounted in the extrusion units 18, as well as in the distributor and the outlet of the cylinder of the extruder 4, these temperature sensors controlling the heating elements 41 so that the temperature of the plastic material is maintained at the required levels at the various points of the apparatus. In certain cases, the die may also be provided with a heating element 42.

Finally, in order to obtain good results, it is indispensable for the speed of each of the wires f to correspond constantly to the flow of plastic material so that the insulating sheath may be deposited uniformly on the wire. Thus the flow-regulating device made up of the elements 37, 38, 39, 40 may be controlled by the speed of travel of the wire f and, consequently, by the operating speeds of the withdrawal mechanism and of the wiredrawer 1.

It should be noted that it is not absolutely necessary to interpose a displacement pump such as the pump 11 between the cylinder of the extruder 4 and the extrusion unit 18. In the case of apparatus treating only one wire, for example, this pump could be eliminated. However, in the case of apparatus treating a plurality of wires in parallel, the presence of the pumps 11 provides several additional advantages. It is possible to regulate the flow into the various extrusion units 18 independently of one another and, consequently, to work with different units and treat wires of different diameters in parallel. Moreover, these pumps make it possible to block one of the lines while still allowing the other to operate. For instance, in the event of breakage of a wire in the wiredrawer, the corresponding pump may immediately be cut off by a detector safety device. Since it is a displacement pump, it then acts as a stop gate which closes. The pressure in the distributor duct 8 is maintained, and the other extrusion units can continue to operate while the unit corresponding to the broken wire is dismantled and put back in order.

A more specific description will now be given of the operating conditions which enable the production, by means of the apparatus described above, of enamel-insulated wire answering the specifications of DIN standards 46416 ff., especially 46435 and 46453.

The first requirement to be met in order to produce wire resistant to the specified maximum temperatures (type A 180) is that the insulation must withstand a temperature of 265° C. without breakdown. For this purpose, certain partially crystalline thermoplastic polycondensates, wherein the melting-point of the crystalline elements is above 170° C., or preferably even 250° C., are used as insulating material. Certain known products, such a polyethylene terephthalate (PETP), 6,6-polyamide, or polyphenyl sulfide, meet these requirements. These are very high melting-point thermoplastic products which may be introduced into the hopper of the extruder in the form of pellets, powder, or a conglomerate. The mixing of these products in the extruder raises their temperature to above their softening-point. The heating elements with which both the cylinder of the extruder 4 and the extrusion head 3 are equipped then make it possible to increase the temperature still further. Thus the temperature control permits gradually reaching a temperature of about 320° C. in the extrusion unit 18 when the material used is polyethylene terephthalate (melting-point 256° C. with 6,6-polyamide (melting-point 255° C.), and about 320°–340° C. with certain products having a melting-point of 280° C. Hence the plastic material reaches the extrusion unit in a state which is appreciably above its melting-point, so that it behaves as a truly hydrostatic fluid.

It has been found that it is advisable to exert upon this fluid pressure amounting to from 10 to 1,000 bars, as the case may be. Preferably, however, this pressure will be above 60 bars, and the pumps 11 will provide a compression ratio of 1:2, the pressure at the outlet of the extruder thus being half the final pressure. It will be noted that this pressure is maintained in the chamber situated between the gauging die and the guiding die owing to the particular configuration of the passageway of the gauging die, and especially owing to the cone 35, the dimensions of which will therefore be selected accordingly.

As has already been stated above, the speed of travel of the wire f constitutes the initial value which controls the operation of the apparatus, and particularly the output of the extruder. Whereas in apparatus utilizing a bath, the speed of travel of the wire is limited to a few meters or a few dozen meters per minute, it has proved possible when using apparatus such as is described above to vary the speed of travel of the wire from about 20–50 m./min. up to speeds on the order of 300–500 m./min. depending upon the products used. Owing to the shape of the distribution chamber situated within the extrusion unit, the plastic material is pulled along by the wire inside the compressing means 35 and into the passageway 36, so that it is subjected to very strong radial pressure when passing through the die. As a result, the wire is kept perfectly centered in the passageway 36, on the one hand, and the plastic material forms a compressed and compact sheath upon the wire, on the other hand. With the precision unit described above, it has been possible to produce insulation about 20–50 microns thick on wire from 0.6 to 1 mm. in diameter and a hardness of from 1H to 3H (DIN 45453).

With the products mentioned above, simple cooling suffices to give the insulating sheath its definitive structure. As a variation, curing treatments such as exposure to beta- or gamma-rays might also be utilized.

The thermoplastic materials mentioned above by way of example have been thoroughly tested in apparatus of the type described, and the results of these tests are set forth in co-pending application Ser. No. 811,364, now U.S. Pat. No. 4,145,474, entitled "Method of Manufacturing Insulated Electric Wire of the Enamelled-Wire Type by Extrusion," which discloses a method utilizing an extrusion material containing at least one partially crystalline thermoplastic polycondensate wherein the melting-point of the crystallites is above 170° C. This co-pending application contains examples of these thermoplastic materials.

Other thermoplastic products may, of course, equally well be used to feed the extruder of the apparatus described. Several such products may be mixed, and it is possible to add additives thereto, e.g., dye pigments, or resins facilitating flow in the unit.

Generally speaking, the method described is applicable for wire having a metal core between 0.1 and 4.0 mm. in diameter.

What is claimed is:

1. Method of manufacturing electric insulated wires for use in magnetic windings for motors, transformers, and the like, which wires comprise a metal core covered with an insulation sheath having a predetermined diameter of a magnitude 10 to 100 micrometers greater than the diameter of the core for a core diameter of 0.1 to 4 mm, comprising the steps of processing a synthetic resin having a melting point of at least 250° C. through a screw extruder with simultaneous heating of the resin to a temperature at least 30° C. higher than said melting point to obtain said resin in a hydrostatic liquid state, forwarding said resin from said screw extruder into an extrusion head for feeding said head with said resin in said hydrostatic liquid state and in a pressure comprised between 10 and 1000 bars, said head having at least one inlet opening for receiving the metal core therein, at least one outlet opening for delivering the insulated wire with the said sheath thereon, and a distribution chamber of a fixed size with static compression means, for bringing said resin onto said core, regulating said pressure to keep it at a constant value, and travelling said core through said extrusion head at a speed such that the resin is pulled along by the core.

2. Method according to claim 1, wherein said pressure is felt by a pressure detector, and the speed of the extruder screw is controlled by a regulator connected to said pressure detector.

3. Method according to claim 1, wherein said constant pressure is higher than 70 bars.

4. Method according to claim 1, comprising feeling the temperature of the resin in the extrusion head and controlling heating elements for keeping said temperature at a constant value.

5. Method according to claim 4, wherein said temperature is about 40° C. higher than the melting-point of the said resin.

6. Method according to claim 1, further comprising the step of continuously subjecting said wire to an annealing treatment irremediably before entering said extrusion unit.

* * * * *